United States Patent [19]

Kume

[11] Patent Number: 4,669,010
[45] Date of Patent: May 26, 1987

[54] FLOPPY DISK DRIVE

[75] Inventor: Kazunari Kume, Saitama, Japan

[73] Assignee: Citizen Watch Co., Ltd., Tokyo, Japan

[21] Appl. No.: 765,954

[22] Filed: Aug. 14, 1985

[30] Foreign Application Priority Data

Aug. 18, 1984 [JP] Japan ................... 59-172145

[51] Int. Cl.$^4$ .................. G11B 5/58; G11B 21/20
[52] U.S. Cl. ..................... 360/99; 360/105; 360/109
[58] Field of Search ................... 360/97-98, 360/103-105, 109

[56] References Cited

U.S. PATENT DOCUMENTS

| | | | |
|---|---|---|---|
| 4,309,732 | 1/1982 | Kronfeld et al. | 360/104 |
| 4,328,521 | 5/1982 | Pexton et al. | 360/105 X |
| 4,355,339 | 10/1982 | King et al. | 360/105 |
| 4,379,315 | 4/1983 | Schuler | 360/103 X |
| 4,379,316 | 4/1983 | Krane | 360/105 |
| 4,433,352 | 2/1984 | De Marco et al. | 360/104 X |
| 4,480,281 | 10/1984 | Cantwell | 360/104 |

*Primary Examiner*—John H. Wolff
*Attorney, Agent, or Firm*—Koda and Androlia

[57] ABSTRACT

A floppy disk drive for electro-magnetically writing an information or data onto a floppy disk and reading the stored information or data from the floppy disk as external recording elements in computers. The device have a pair of read/write heads being carried reciprocally along a radial direction of a loaded floppy disk by a carriage which is driven by a stepping motor. Both two heads can properly by maintained in intimate contact with both the magnetic recording sides of the loaded floppy disk to provide a reading/writing operation. The lower head is supported on the carriage by a flexible leaf support spring mounted on the carriage. The leaf support spring consists of a stationary portion rigidly mounted on the carriage and a movable portion cantilevered from the stationary spring portion to support the lower head. On the portion of the carriage below the movable spring portion provided a spring seat portion to limit a downward displacement of the movable spring portion. The moving spring portion can be pressed against the spring seat portion under biasing force of the opposite upper head in a head-loading state.

3 Claims, 7 Drawing Figures

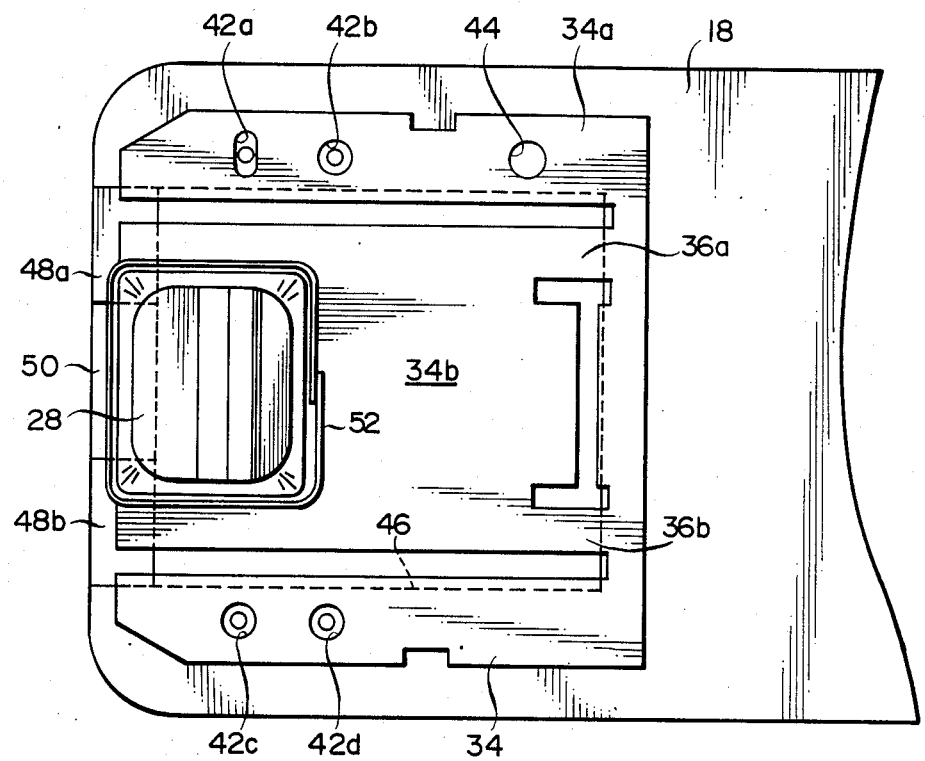
F I G. 2

F I G. 5
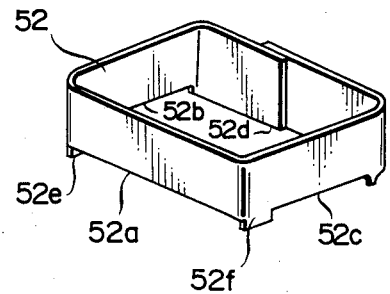
F I G. 6
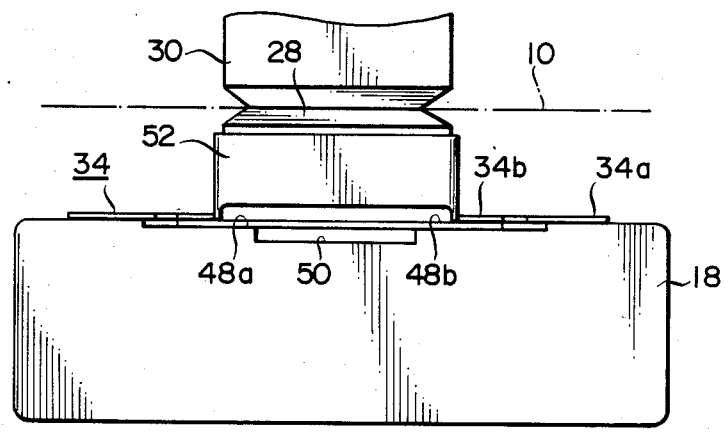

FLOPPY DISK DRIVE

BACKGROUND OF THE INVENTION

1. Field of the Invention

The present invention relates to a floppy disk drive and more particularly to an improved head supporting mechanism for use in the floppy disk drive, which can cause upper and lower heads to be placed in intimate contact with the opposite recording sides of a floppy disk such that reading/writing can be carried out relative to any one of the recording disk sides.

2. Description of the Prior Art

Although various information recording media have been utilized as external recording elements in computers, a magnetic type disk among them is currently used at present since it is random-accessible and superior in handling. In recent years, there has been developed and is generally used a magnetic floppy disk which is in the form of a flexible plastic sheet having a magnetic recording layer coated thereon at least one side. Such floppy disk is increasingly utilized since it has advantageous in that the floppy disk is inexpensive in comparison with the conventional hard disks and in that the floppy disk can simply and easily be replaced by another to expand the memory capacity of a computer.

A floppy disk having its opposite recording sides requires a double-headed floppy disk drive which can optionally write/read relative to any one of the recording sides of the floppy disk. In such a double-headed drive, it is very important that both two heads can properly be maintained in initimate contact with both the magnetic recording sides of a rotating floppy disk to provide a stable writing/reading operation.

One of such floppy disk drives is disclosed in U.S. Pat. No. 4,151,573 in which a lower head is rigidly mounted on a carriage reciprocatable along the diameter of a floppy disk while an upper head is supported in gimbals fashion by arm means rotatably mounted on said carriage. The upper head is biased to the lower head through the floppy disk by the arm means under the biasing action of a spring. The surface of the lower head serves as a reference surface against which the floppy disk is forced. Thus, any displacement of the floppy disk can be eliminated during operation.

Such a drive of the prior art is advantageous in that a stable operation can always be obtained since the floppy disk is properly positioned by the surface of the lower head. On the other hand, a relatively increased biasing force is required to properly position the floppy disk relative to the reference surface, that is, the surface of the lower head since the latter is rigidly mounted on the carriage. This raises such a problem that excessive wear tends to be produced at the boundary between the floppy disk and the heads.

In spite of the aformentioned stationary reference position, the deviation of the rotating floppy disk cannot completely be absorbed, leading to a modulation in writing/reading.

U.S. Pat. No. 4,379,315 discloses another type head mechanism in which, to overcome the problem in the above-mentioned prior art, a lower head itself is displaciable in the direction perpendicular to the disk surface and in the rotational direction about the diameter of the floppy disk. The lower head also is sufficiently yieldable with respect to the rotation of the head about the circumference of the floppy disk.

The last-mentioned disk drive can follow the dynamic displacement of the rotating floppy disk to provide good operative characteristics. However, this floppy disk drive tends to displace the lower head too much. The lower head may be displaced an increased distance in response to a pressure applied thereto by the rotating disk since the lower head is suspended by a torsion spring. This means that a stable writing/reading operation cannot be obtained.

SUMMARY OF THE INVENTION

It is therefore an object of the present invention to provide a floppy disk drive having an improved head supporting mechanism in which a lower head can be displaced in a predetermined and controlled range and is initially displaced by an amount substantially equal to its maximum displacement on loading, thereby to provide very stable writing/reading operation.

To accomplish the above object, the present invention provides a floppy disk drive comprising a lower head carried by a carriage reciprocatable along the diameter of a floppy disk and adapted to intimately contact one of the recording sides of the floppy disk, and an upper head carried by an arm rotatably supported by said carriage and adapted to be placed into intimate contact with the other recording side of the floppy disk at a position opposed to said lower head, said upper head being supported in gimbals fashion by said arm and effective to bias the floppy disk against the lower head under a predetermined pressure by the aid of the biasing force of the arm, said floppy disk drive being characterized by a head supporting mechanism comprising a leaf support spring rigidly mounted on the carriage and on which said lower head is rigidly mounted, said leaf support spring including a stationary portion connected with said carriage and movable portion cantilevered by said stationary portion, the portion of said carriage below said movable portion defining a spring seat depressed a predetermined amount from the surface of said carriage on which said leaf support spring is mounted, said movable spring portion carrying said lower head being urged and positioned relative to said spring seat under the biasing force of said upper head in the normal loading state and being escapable upwardly from said spring seat in a head loading state in which the biasing force of said upper head is decreased.

BRIEF DESCRIPTION OF THE DRAWINGS

FIG. 2 is a plan view illustrating the connection of the lower head shown in FIG. 1 with a carriage.

FIG. 5 is a perspective view of a magnetic shield plate used in the present invention.

FIG. 6 is a view illustrating the downward motion of the head on loading.

DESCRIPTION OF PREFERRED EMBODIMENTS

Figure 1:
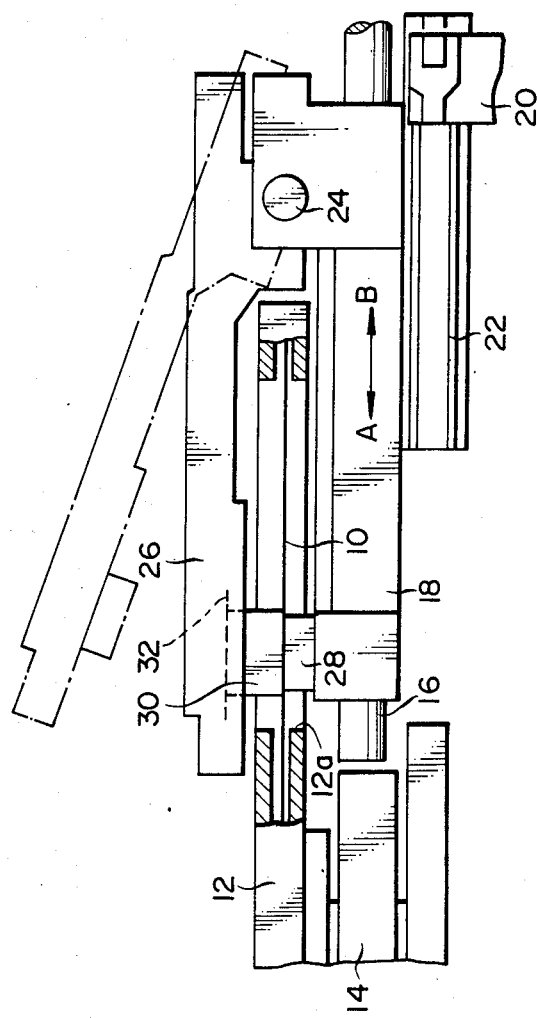
FIG. 1 is a schematic view showing the primary parts of a floppy disk drive incorporating a head supporting mechanism according to the present invention.

FIG. 1 shows the entire construction of a floppy disk drive incorporating a head supporting mechanism according to the present invention. The floppy disk drive comprises a spindle motor 14 on which a floppy disk 10 is loaded and rotationally driven. The floppy disk 10 is in the form of a so-called micro-floppy disk incorporated into a cartridge 12.

The floppy disk drive also comprises a carriage 18 reciprocatable in the direction shown by a double-headed arrow A-B, that is, along the diameter of the floppy disk 10. The carriage 18 is slidably supported on guide rail means 16 which is rigidly mounted on the base plate of the floppy disk drive. In the illustrated embodiment, this reciprocation of the carriage 18 is accomplished by transmitting the rotation of a stepmotor shaft 20 to the carriage 18 through a belt 22.

An arm 26 is pivoted on a shaft 24 mounted on the end of the carriage 18. The arm 26 is biased counterclockwise under the action of a biasing spring (not shown).

Lower and upper heads 28 and 30 are rigidly mounted respectively on the carriage and arm 18, 26 at a position in which these heads are opposed to each other on the opposite sides of the floppy disk 10. The lower and upper heads 28 and 30 can be moved toward the floppy disk 10 through an opening 12a in the cartridge 12 to engage the respective sides of the floppy disk 10 under a predetermined pressure. In accordance with the present invention, the upper head 30 is supported on the arm 26 through gimbals means 32. Thus, the upper head 30 can follow the motion of the lower head 28 for displacement and/or rotation.

Figure 3:
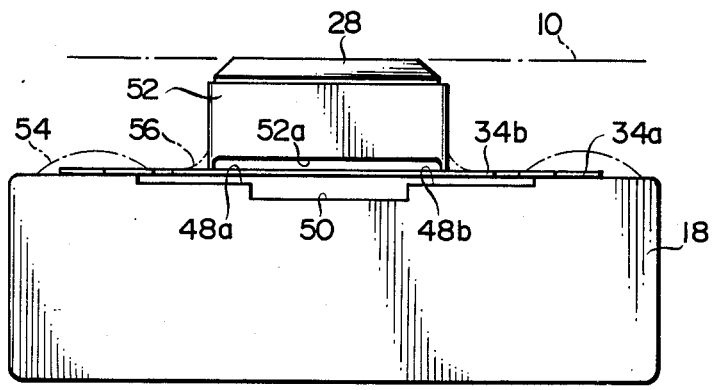
FIG. 3 is a view showing the left-hand end of the construction shown in FIG. 2.
Figure 4:
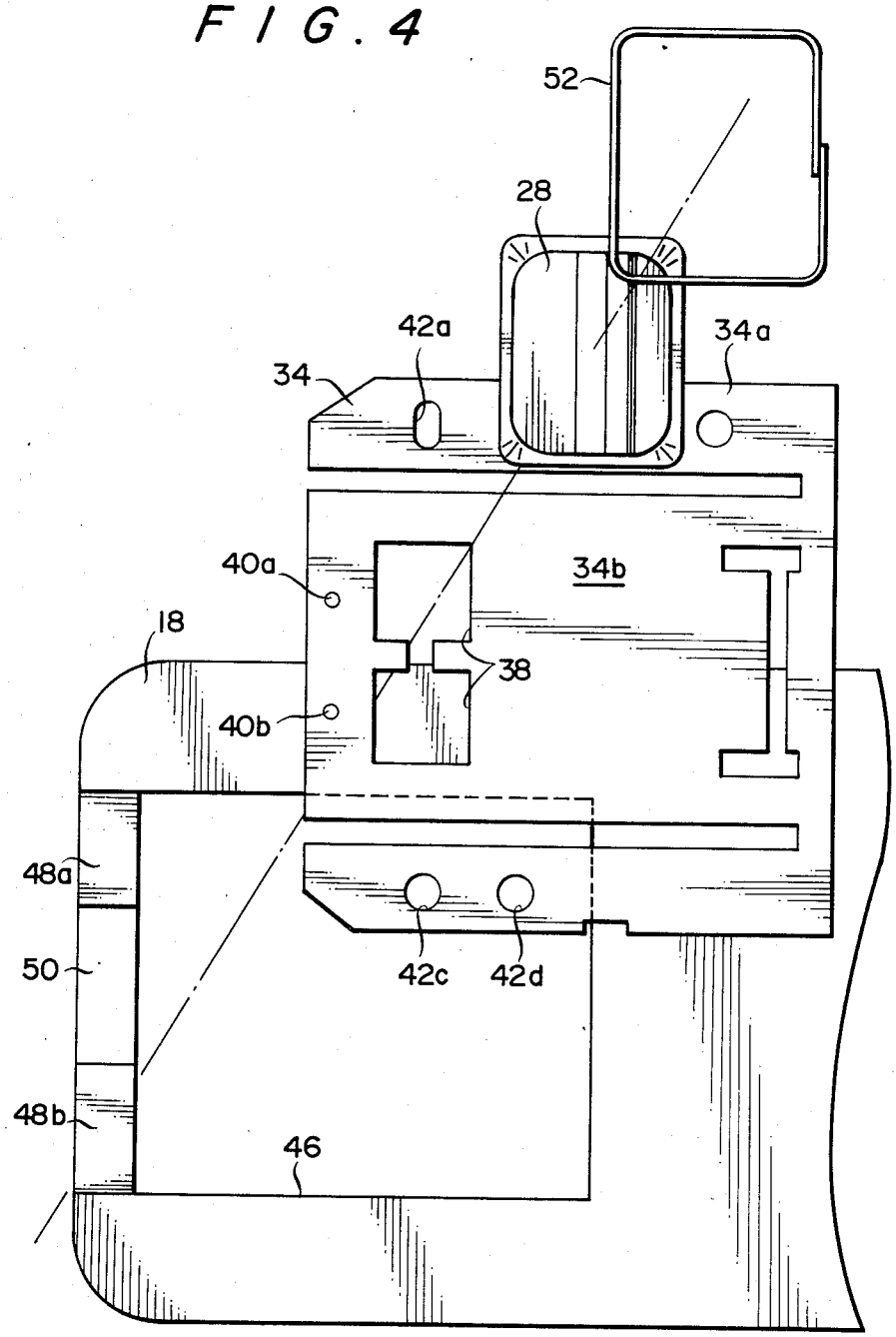
FIG. 4 is a exploded view of the construction shown in FIG. 2.

The present invention also is characterized by the fact that the lower head 28 is supported by a leaf support spring 34 such that the lower head 28 can be displaced within a predetermined range of motion. The details of this leaf support spring 34 are shown in FIGS. 2 through 4.

The lower head 28 is rigidly mounted on the forward end of the carriage 18 through the leaf support spring 34 which is made of a flexible stainless steel plate (for example, of 0.2 mm thick), a flexible beryllium-copper plate or the like.

The leaf support spring 34 includes an outer, substantially C-shaped stationary portion 34a rigidly mounted on the carriage 18 and an inner movable portion 34b rigidly supporting the lower head 28. In the illustrated embodiment, the movable spring portion 34b is cantilevered from the stationary spring portion 34a by two flexible parts 36a and 36b such that the movable spring portion 34b will be resilient across the thickness of the plate. This resiliency is promoted also by the distortion of the movable spring portion 34b itself. Thus, the movable spring portion 34b can be moved a predetermined amount relative to the stationary spring portion 34a through the flexible connections 36a and 36b in the direction perpendicular to the plane of the drawing (across the thickness of the plate).

The movable spring portion 34b is provided with an opening 38 at a position in which the lower head 28 is rigidly mounted on the leaf support spring 34. The lower head 28 includes writing/reading and erasing coils the leads of which externally pass through the opening 38.

The movable spring portion 34b further includes apertures 40a and 40b formed therein which are filled with an adhesive material for fixing the lower head 28 relative to the leaf support spring 34. On the other hand, the stationary spring portion 34a is provided with four apertures 42a, 42b, 42c and 42d which are filled with the adhesive material used to fix the leaf support spring 34 relative to the carriage 18. The stationary spring portion 34a also is provided with a further aperture 44 used in aid of various operations such as assembling and others.

The forward end of the carriage 18 is provided with an opening 46 formed therein at a position opposing to the leaf support spring 34. The opening 46 is slightly larger than the dimensions of the movable spring portion 34b so that the movable spring portion 34b can be moved into the opening 46 of the carriage 18 when the leaf support spring 34 is properly positioned on the carriage 18 as shown in FIG. 2. Moreover, the opening 46 permits the aforementioned leads of the lower head 28 to be conducted to any external control circuit.

In a specific aspect of the present invention, the motion of the movable spring portion 34b and thus the lower head 28 to the carriage 18 can be limited by part of the carriage 18 so that the lower head 28 will properly be positioned in the normal head-loading state. In the illustrated embodiment, the carriage 18 includes two spring seats 48a and 48b formed therein forwardly of the opening 46.

The spring seats 48a and 48b are formed on a bridge portion 50 which is formed on the forward end of the carriage 18 to close the opening 46. As be best seen from FIG. 3, the bridge portion 50 provides a depressed face between the spring seats 48a and 48b.

The downward movement of the movable spring portion 34b can be limited by the two spring seats 48a and 48b. In the illustrated embodiment, this downward movement of the movable spring portion 34b from the surface of the carriage 18 on which the leaf support spring 34 is mounted to the spring seats 48a to 48f is set to be 40-50 microns. Normally, this downward movement is preferably 100 microns or less.

After the lower head 28 has been rigidly mounted on the carriage 18 through the leaf support spring 34 to be movable vertically with the leaf support spring 34, a magnetic shield plate 52 is mounted on the leaf support spring 34 to surround the lower head 28 such that the lower head 28 will not receive any external noise such as the magnetic noise from the spindle motor 14. The magnetic shield plate 52 may be in the form of a square frame made by folding a sheet of magnetic material such as permalloy or the like.

FIG. 5 shows an example of such a magnetic shield plate 52 which includes clearances 52a, 52b and 52c formed therein respectively at the forward and lateral bottom edges thereof. These clearances 52a, 52b and 52c are adapted to receive any excess adhesive externally forced when the lower head 28 is attached to the leaf support spring 34. Thus, the magnetic shield plate 52 can be positioned in close proximity to the lower head 28. In effect, the magnetic shield plate 52 is properly positioned on the leaf support spring 34 surrounding the lower head 28 by means of the rearward bottom edge 52d and the forward, lateral bottom corners 52e, 52f in the magnetic shield plate 52. As seen from FIG. 2, the rearward side of the magnetic shield plate 52 is spaced away from the lower head 28 a distance larger than that between the forward side of the magnetic shield plate 52 and the lower head 28 so that the lower head 28 can magnetically be shielded from the spindle motor 14 and also positively be fixed to the leaf support plate 34.

The masses of set adhesive material used to connect the magnetic shield plate 52 with the leaf support spring 34 are shown by broken lines 54 and 56 in FIG. 3.

In the non-loading state of FIG. 3, the lower head 28 does not receive any biasing force. Thus, the leaf support spring 34 supporting the lower head 28 will not flex, maintaining a spacing (for example, of 40 microns) between the bottom face of the leaf support spring 34 and the spring seats 48a and 48b.

FIG. 6 shows the head-loading state in which a biasing force is applied from the upper head 30 through the loaded floppy disk 10 to the lower head 28 under the rotational motion of the arm 26. Thus, the lower head 28 is downwardly moved to deflect the leaf support spring 34 toward the spring seats 48a and 48b of the carriage 18. Under the normal head-loading state, the movable portion 34b of the leaf support spring 34 is moved until it contacts the spring seats 48a and 48b. Such a position may be referred to as "a stable head-loading position".

Indeed, where the leaf support spring 34 is of 0.2 mm thick and the downward movement of the lower head 28 from the surface of the carriage 18 on which the leaf support spring 34 is mounted to the spring seats 48a and 48b of the carriage 18 is set to be 40 microns, the movable portion 34b of the leaf support spring 34 is moved under a biasing force of about 15g until it contacts the spring seats 48a and 48b. The lower head 28 is thus positioned at the normal and stable head-loading position.

When a force larger than the normal biasing force is applied to the lower head 28 during the head-loading, the movable spring portion 34b will positively be positioned by the spring seats 48a, 48b so that a further downward movement of the lower head 28 can positively be prevented. Moreover, the lower head 28 can follow the floppy disk 10 to move upwardly by the initial downward movement of the lower head 28 even when the force depressing the lower head 28 is decreased to move the floppy disk 10 upwardly. This followability of the lower head 28 relative to the floppy disk 10 can highly be improved in co-operation with the flexibility of the upper head 30 in the gimbals fashion.

The lower head 28 can follow the floppy disk 10 not only in the vertical direction but also in the direction of rolling. This provides a stable writing/reading operation.

Figure 7:
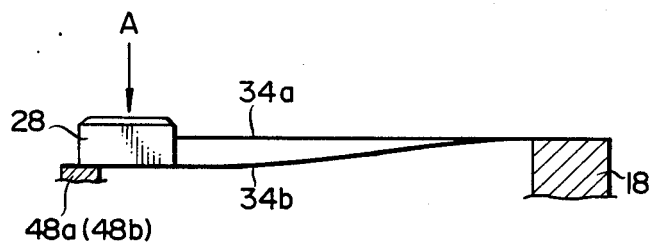
FIG. 7 is a view illustrating the flexion of a movable portion of a spring used in the present invention.

FIG. 7 shows the flexion of the cantilevered leaf spring 34 used in the previously described embodiment. In general, a cantilevered member tends to produce an inclination at the forward end thereof. In the illustrated embodiment, however, the movable spring portion 34b supported in the cantilever fashion can be maintained parallel at the lower head 28 by suitably setting the biasing force from the upper head 30, as shown in FIG. 7. This is because the spring seats 48a and 48b on the carriage 18 are adapted to contact the movable spring portion 34a only at a location opposing to the forward end of the lower head 28 and because the point of application A of the biasing force from the upper head 30 is located inwardly of the spring seats 48a and 48b toward the fulcrum as seen from FIG. 7.

In accordance with the present invention, of course, the lower head 28 is maintained at its substantially stable position under the normal head-loading state. Therefore, any undesirable action such as off-truck in writing/reading or the like can positively be avoided.

Any impact transmitted from the upper head 30 to the lower head 28 during the head-loading can well be absorbed by the flexible connections on the leaf support spring 34. This means that the heads and associated parts can positively be prevented from damaging and that any vibration can effectively be absorbed.

Although the downward movement of the lower head is set in the range of 40 to 50 microns in the illustrated embodiment, it can optionally be selected. Also, although the downward movement of the lower head is accomplished under the biasing force of about 15g in the illustrated embodiment, this biasing force can optionally be selected.

In summary, since the lower head is supported in the cantilever fashion by the leaf support spring to be capable of moving into the carriage, the movable portion of the leaf support spring can engage the spring seats on the carriage into the stable writing/reading position under the normal head-loading state. If the biasing force is changed, the lower head can freely follow the changed biasing force to provide a very improved writing/reading performance. Even if the initial biasing force of the arm is determined to be relatively little, the above followability of the lower head provides a sufficiently improved writing/reading operation. Further, the present invention permits the easy connection of the lower head leads on the leaf support spring with any circuitry through the carriage. Therefore, the termination of the coils can easily be carried out to improve their electrical reliability.

I claim:

1. A floppy disk drive comprising a lower head carried by a carriage reciprocatable along the diameter of a loaded floppy disk and adapted to be placed in intimate contact with one of the recording sides of said floppy disk and an upper head carried by arm means rotatably supported on said carriage and adapted to be placed in intimate contact with the other recording side of said floppy disk at a position opposing to said lower head, said upper head being supported on said arm means by a gimbal spring, and also said upper head being adapted to bias the floppy disk against the lower head under a predetermined pressure by the biasing force of said arm means, said floppy disk drive being characterized by a head supporting mechanism which includes a single flexible leaf support spring mounted on said carriage for supporting said lower head and onto which said lower head is mounted, said leaf support spring including a stationary portion rigidly mounted on said carriage and a movable portion cantilevered from said stationary spring portion, the portion of said carriage below said movable spring portion defining spring seat means located a predetermined amount downwardly of the portion of said carriage on which said leaf support spring is rigidly mounted, whereby said movable spring portion carrying said lower head can be pressed against and positioned relative to said spring seat means under the biasing force of said upper head in the normal head-loading state and can move upwardly from said spring seat means when the biasing force of said upper head is decreased.

2. A floppy disk drive as defined in claim 1, characterized by a magnetic shield plate rigidly mounted on said movable portion of said leaf support spring to surround said lower head.

3. A floppy disk drive as defined in claim 2, characterized in that the bottom edges of said magnetic shield plate is provided with clearance means for avoiding any excess mass of adhesive material used to attach said lower head to said movable spring portion.

* * * * *